United States Patent
Sato

(10) Patent No.: US 10,081,354 B2
(45) Date of Patent: Sep. 25, 2018

(54) MOTOR CONTROLLER FOR HYBRID VEHICLE

(71) Applicant: TOYOTA JIDOSHA KABUSHIKI KAISHA, Toyota-shi (JP)

(72) Inventor: Ryoji Sato, Toyohashi (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 158 days.

(21) Appl. No.: 15/102,222

(22) PCT Filed: Nov. 19, 2014

(86) PCT No.: PCT/JP2014/081298
§ 371 (c)(1),
(2) Date: Jun. 6, 2016

(87) PCT Pub. No.: WO2015/087700
PCT Pub. Date: Jun. 18, 2015

(65) Prior Publication Data
US 2016/0311426 A1    Oct. 27, 2016

(30) Foreign Application Priority Data

Dec. 10, 2013   (JP) ................................. 2013-255077

(51) Int. Cl.
*B60W 20/15* (2016.01)
*B60L 3/04* (2006.01)
(Continued)

(52) U.S. Cl.
CPC .............. *B60W 20/15* (2016.01); *B60L 3/04* (2013.01); *B60L 7/14* (2013.01); *B60L 11/005* (2013.01);
(Continued)

(58) Field of Classification Search
CPC ........... B60L 9/18; B60L 11/14; B60W 20/00; B60K 6/485
See application file for complete search history.

(56) References Cited

U.S. PATENT DOCUMENTS 8,421,424 B2 *   4/2013   Ishii ....................... H02M 3/156
                                                    323/207
8,796,960 B2 *   8/2014   Okamura ................ B60L 15/08
                                                    318/139
(Continued)

FOREIGN PATENT DOCUMENTS

EP     2 206 622 A1    7/2010
EP     2 612 787 A1    7/2013
(Continued)

OTHER PUBLICATIONS

International Search Report and Written Opinion dated Feb. 23, 2015 in PCT/JP2014/081298 filed Nov. 19, 2014.

*Primary Examiner* — Thomas G Black
*Assistant Examiner* — Ana D Thomas
(74) *Attorney, Agent, or Firm* — Oblon, McClelland, Maier & Neustadt, L.L.P.

(57) ABSTRACT

In a hybrid vehicle, noise occurrence caused in a rectangular wave control of a motor is restricted when a motor running mode is selected with a converter boosting limit applied. A motor controller for a hybrid vehicle mounted with an internal combustion engine and a motor as power sources is provided. The motor controller includes a converter capable of boosting a voltage supplied from a power supply device; an inverter which converts an output voltage of the converter to an AC voltage and applies the AC voltage to the motor; and a control unit which controls the inverter to drive the motor by switching between two or more control modes. When a running mode to drive the vehicle by a motor power alone is selected with a boost limit applied to the output
(Continued)

voltage of the converter and when the motor is driven in a rectangular wave control mode or an overmodulation PWM control mode, the control unit raises the output voltage of the converter higher than a boost limit value and controls the inverter such that the control mode is switched to drive the motor in a sinusoidal PWM control mode.

8 Claims, 6 Drawing Sheets

(51) Int. Cl.
    *B60L 7/14*     (2006.01)
    *B60L 11/00*     (2006.01)
    *B60L 11/12*     (2006.01)
    *B60L 11/14*     (2006.01)
    *B60L 11/18*     (2006.01)
    *B60L 15/00*     (2006.01)
    *B60L 15/02*     (2006.01)
    *B60L 15/06*     (2006.01)
    *B60L 15/08*     (2006.01)
    *B60L 15/20*     (2006.01)
    *H02P 6/08*     (2016.01)
    *H02P 23/00*     (2016.01)
    *B60W 10/08*     (2006.01)

(52) U.S. Cl.
    CPC ........... *B60L 11/123* (2013.01); *B60L 11/14* (2013.01); *B60L 11/1864* (2013.01); *B60L 11/1881* (2013.01); *B60L 15/007* (2013.01); *B60L 15/025* (2013.01); *B60L 15/06* (2013.01); *B60L 15/08* (2013.01); *B60L 15/2009* (2013.01); *B60L 15/2045* (2013.01); *B60W 10/08* (2013.01); *H02P 6/08* (2013.01); *H02P 23/009* (2013.01); *H02P 23/0086* (2013.01); *B60L 2210/14* (2013.01); *B60L 2210/40* (2013.01); *B60L 2240/12* (2013.01); *B60L 2240/421* (2013.01); *B60L 2240/423* (2013.01); *B60L 2240/527* (2013.01); *B60L 2240/529* (2013.01); *B60L 2250/12* (2013.01); *B60L 2250/16* (2013.01); *B60L 2250/18* (2013.01); *B60L 2250/24* (2013.01); *B60L 2250/30* (2013.01); *B60L 2270/142* (2013.01); *H02P 2209/07* (2013.01); *H02P 2209/11* (2013.01); *H02P 2209/13* (2013.01); *Y02T 10/6217* (2013.01); *Y02T 10/643* (2013.01); *Y02T 10/644* (2013.01); *Y02T 10/7022* (2013.01); *Y02T 10/7061* (2013.01); *Y02T 10/7077* (2013.01); *Y02T 10/7225* (2013.01); *Y02T 10/7241* (2013.01); *Y02T 10/7283* (2013.01); *Y02T 90/34* (2013.01); *Y10S 903/906* (2013.01)

(56) References Cited

U.S. PATENT DOCUMENTS

| | | | |
|---|---|---|---|
| 9,166,511 B2* | 10/2015 | Morii | H02P 21/0085 |
| 9,376,103 B2* | 6/2016 | Ueda | B60K 6/442 |
| 9,694,696 B2* | 7/2017 | Kumazawa | B60L 11/1803 |
| 2009/0237019 A1 | 9/2009 | Yamakawa et al. | |
| 2010/0168943 A1 | 7/2010 | Fukushiro et al. | |
| 2011/0006723 A1 | 1/2011 | Yamakawa et al. | |
| 2013/0108938 A1* | 5/2013 | Kake | H01M 8/04037 429/416 |
| 2013/0173108 A1 | 7/2013 | Hashimoto | |
| 2014/0028225 A1* | 1/2014 | Takamatsu | H02P 6/08 318/400.3 |
| 2014/0139156 A1 | 5/2014 | Hayashi et al. | |
| 2015/0280486 A1* | 10/2015 | Hsu | B60L 11/1818 320/107 |
| 2017/0012565 A1* | 1/2017 | Oi | H02P 27/085 |
| 2017/0036554 A1* | 2/2017 | Kumazawa | B60L 3/0023 |

FOREIGN PATENT DOCUMENTS

| | | | | |
|---|---|---|---|---|
| JP | 2007-159214 A | 6/2007 | | |
| JP | 2007-306658 A | 11/2007 | | |
| JP | 2008-132806 A | 6/2008 | | |
| JP | 2009-33947 A | 2/2009 | | |
| JP | 2010-207030 A | 9/2010 | | |
| JP | 2010207030 A | * | 9/2010 | ............ B60L 11/123 |
| JP | 2013-192429 A | 9/2013 | | |
| WO | WO 2013/001634 A1 | 1/2013 | | |

* cited by examiner

FIG. 2

| CONTROL MODE | A1 SINUSOIDAL PWM CONTROL MODE | A2 OVERMODULATION PWM CONTROL MODE | A3 RECTANGULAR WAVE CONTROL MODE (ONE PULSE) |
|---|---|---|---|
| INVERTER OUTPUT VOLTAGE WAVEFORM | BASIC WAVE COMPONENTS | BASIC WAVE COMPONENTS | BASIC WAVE COMPONENTS |
| MODULATION DEGREE | 0~0.6 | 0.61~0.78 | 0.78 |
| CHARACTERISTICS | TORQUE MODULATION IS SMALL | OUTPUT POWER IN MIDDLE-SPEED RANGE IS IMPROVED | OUTPUT POWER IN HIGH-SPEED RANGE IS IMPROVED |

FIG. 3

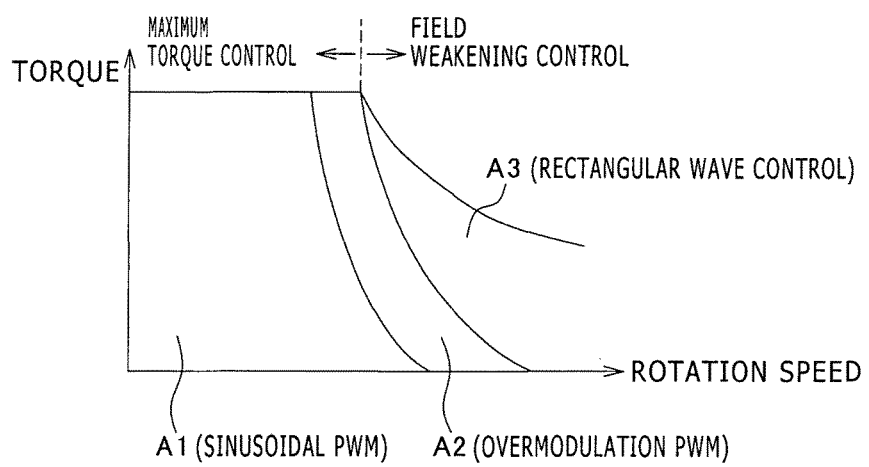

FIG. 4

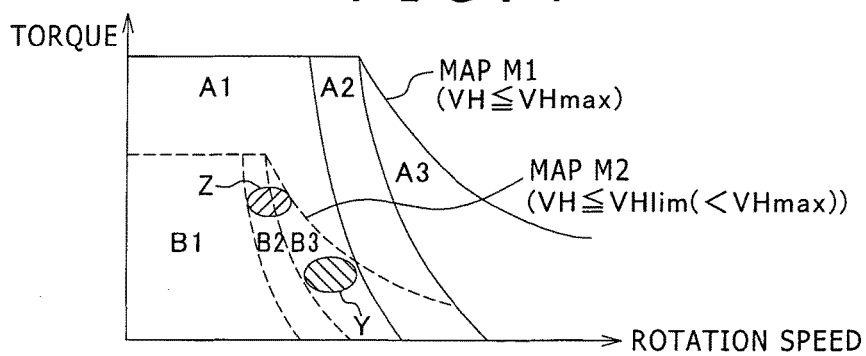

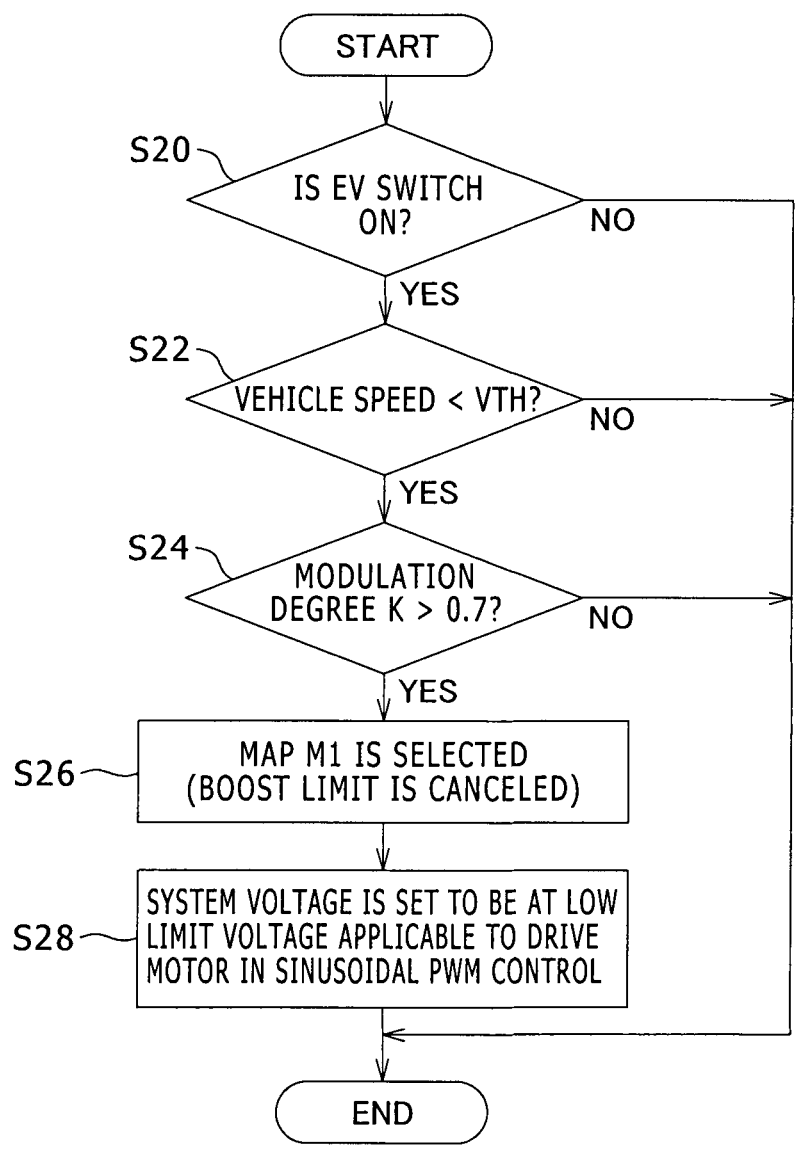

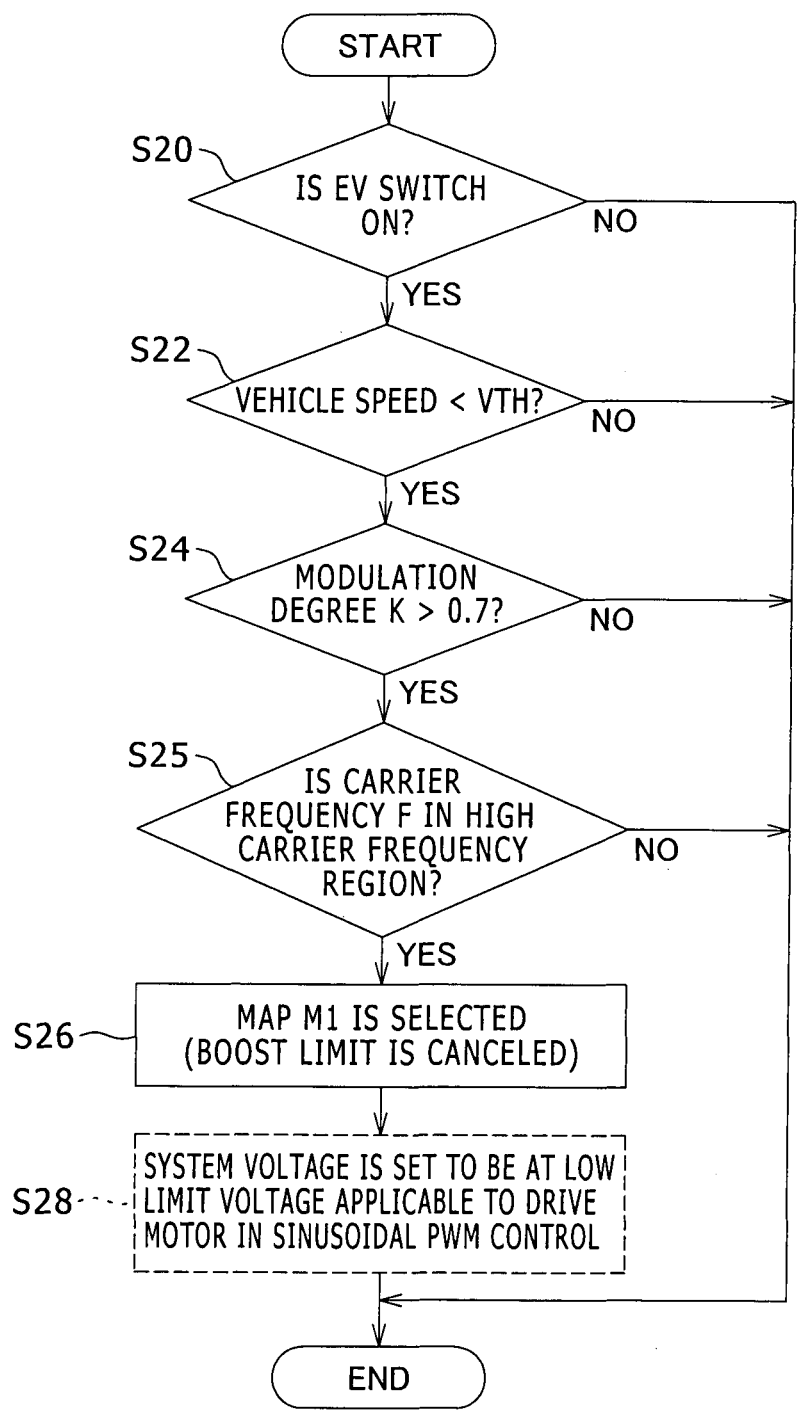

MOTOR CONTROLLER FOR HYBRID VEHICLE

TECHNICAL FIELD

The present invention relates to a motor controller for a hybrid vehicle mounted with an internal combustion engine and a motor as power sources.

BACKGROUND ART

Conventionally, in a hybrid vehicle mounted with an internal combustion engine and a motor as running power sources, drive control has been performed by switching between two or more motor control modes including, for example, a sinusoidal Pulse Width Modulation (PWM) control mode, an overmodulation PWM control mode, and a rectangular wave control mode.

For example, JP 2007-306658 A (hereinafter referred to as "Patent Literature 1") discloses a motor drive system in which a DC voltage supplied from a battery is boosted by a boost converter and input to an inverter which converts the DC voltage to an AC voltage and applies the AC voltage to a motor for driving the motor. In this motor drive system, a motor control mode can be switched from a sinusoidal PWM control mode to a rectangular wave control mode for the same operation point of the motor by lowering a boost voltage boosted by a boost converter. As a result, system efficiency can be improved, further resulting in improved fuel efficiency of a vehicle.

CITATION LIST

Patent Literature

[PTL 1] JP 2007-306658 A

SUMMARY OF INVENTION

Technical Problem

When a motor is driven in a rectangular wave control mode, more higher-order harmonic components are superimposed to a current flowing in a motor than when the motor is running in a sinusoidal PWM control mode. Therefore, current ripples caused by the harmonic components more easily occur, sometimes causing a larger high-frequency noise during running of a vehicle.

Therefore, it is problematic that when a motor is driven in a rectangular wave control mode by lowering a boost voltage boosted by a boost converter as described in Patent Literature 1 and, for example, a driver selects a motor running mode by operating a switch or the like so as to achieve quiet running, it is impossible to avoid occurrence of high-frequency noise in the rectangular wave control mode.

An object of the present invention is to restrict occurrence of noise in rectangular wave control of a motor when a motor running mode is selected with a boost limit applied to a converter in a hybrid vehicle.

Solution to Problem

The present invention provides a motor controller for a hybrid vehicle mounted with an internal combustion engine and a motor as power sources, the motor controller comprising; a converter capable of boosting a voltage supplied from a power supply device; an inverter which converts an output voltage of the converter to an AC voltage and applies the AC voltage to the motor; and a control unit which controls the inverter to drive the motor by switching between a plurality of control modes; wherein when a running mode to drive the vehicle by a motor power alone is selected with a boost limit applied to the output voltage of the converter and when the motor is in a rectangular wave control mode or an overmodulation PWM control mode, the control unit raises the output voltage of the convertor higher than a boost limit value and controls the inverter such that the control mode is switched to drive the motor in a sinusoidal PWM control mode.

According to this configuration, when the motor running mode is selected with some further boosting applicable by the converter, the output voltage of the converter (that is, the input voltage to the inverter) is raised higher than a boost limit value and the control mode of the motor is switched from the rectangular wave control mode or the overmodulation PWM control mode to the sinusoidal PWM control mode. In this way, as occurrence of the ripples in the motor current can be restricted, the high-frequency noise can be restricted accordingly.

In a motor controller according to the present invention, it is preferable that the output voltage of the converter is raised higher than the boost limit value when the vehicle speed is below a predetermined threshold. According to this configuration, a high-frequency noise can be restricted during low-speed running in which the vehicle, inside and outside, becomes more quiet because of smaller tire noise.

Further, in a motor controller according to the present invention, the control unit may set the output voltage of the converter such that the motor is driven at a low limit voltage applicable in the sinusoidal PWM control mode. According to this configuration, fuel efficiency deterioration due to a converter boost loss can be minimized.

Further, in a motor controller according to the present invention, the control unit may change a carrier frequency used in the sinusoidal PWM control mode such that when a rotation speed of the motor is lower, the carrier frequency becomes lower; and when the carrier frequency belongs to a predetermined high carrier frequency region, the output voltage of the converter is raised higher than the boost limit value; and the control is performed in the sinusoidal PWM control mode.

If an inverter input voltage is increased when a switching cycle is long due to a low carrier frequency used by the inverter, a current change during a switching control cycle becomes larger than with a high carrier frequency, resulting in larger current ripples and increased noise. Therefore, according to this configuration, the noise increase can be restricted by switching to the sinusoidal PWM control by setting the boost voltage higher than the boost limit value when the carrier frequency belongs to a relatively high-frequency region.

Advantageous Effects of Invention

According to the present invention, it becomes possible to restrict occurrence of noise in a rectangular wave control of a motor when a motor running mode is selected with a converter in a boost limit state in a hybrid vehicle.

BRIEF DESCRIPTION OF DRAWINGS

FIG. 2 is a table showing control modes when a control unit shown in FIG. 1 controls an inverter.

FIG. 3 is a graph showing how the control unit of FIG. 1 sets the control modes.

FIG. 4 is a graph showing a relationship between a boost voltage boosted by a converter and the control modes shown in FIG. 3.

FIG. 9 is a flowchart showing another example of a boost limit canceling process performed by a control unit.

FIG. 10 is a flowchart showing yet another example of a boost limit canceling process performed by a control unit.

DESCRIPTION OF EMBODIMENTS

Embodiments according to the present invention are described below in detail with reference to attached drawings. In the description, specific shapes, materials, values, directions, or the like are provided merely as examples, and may be appropriately modified in accordance with usage, purpose, specifications, or the like. Further, when two or more embodiments or variations are included below, any appropriate combinations of their features are expected.

Further, although a hybrid vehicle mounted with an internal combustion engine and a single motor is described below as an example, the present invention is not limited to this example. The present invention is also applicable to the hybrid vehicle mounted with two or more motors (or motor generators). In such a case, at least one motor may mainly serve as a drive electric motor, and at least one other motor may mainly serve as a power generator.

Figure 1:
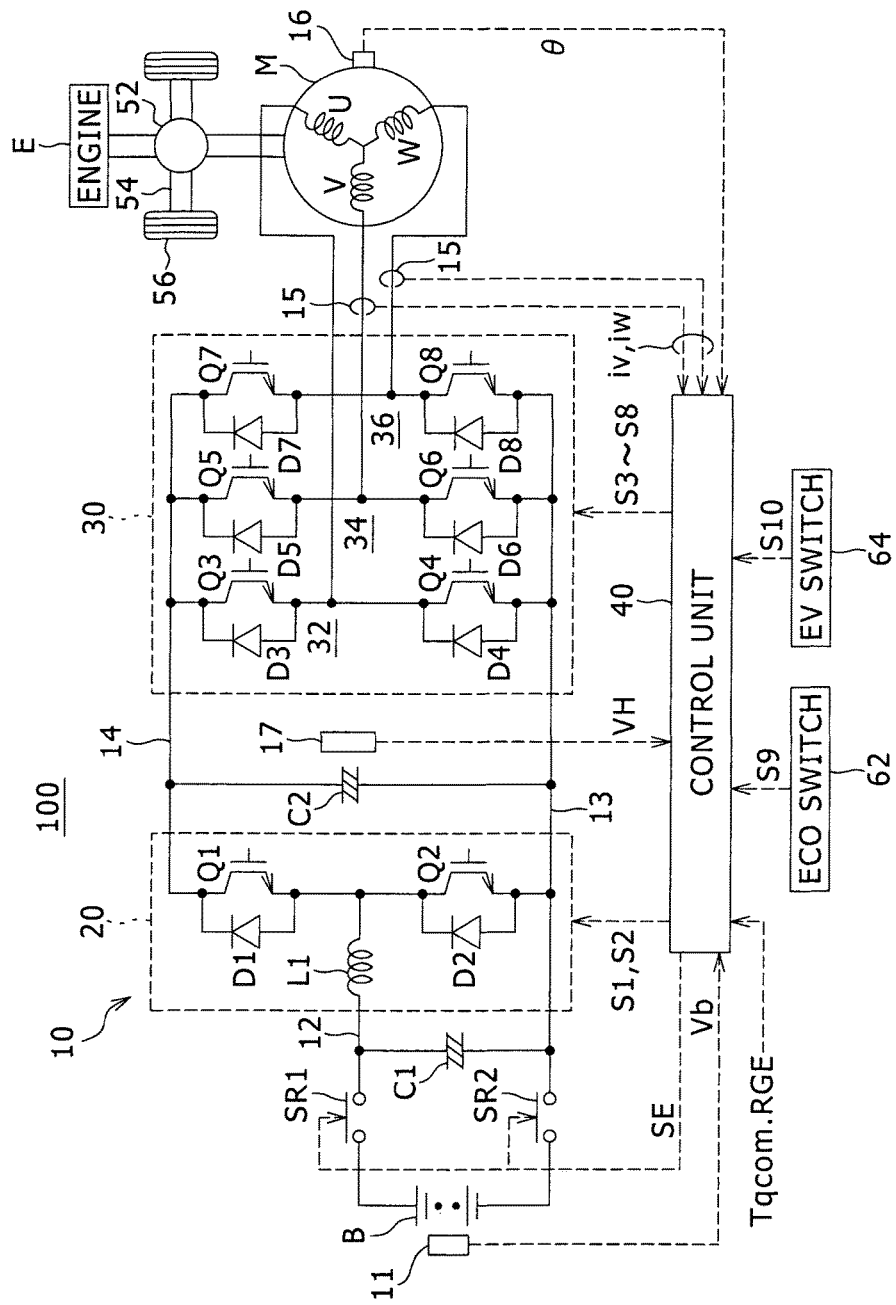
FIG. 1 is a diagram showing a schematic configuration of a hybrid vehicle including a motor controller.

FIG. 1 is a diagram showing the entire configuration of a hybrid vehicle 100 including a motor controller 10 according to an embodiment of the present invention. As shown in FIG. 1, the hybrid vehicle 100 includes an engine E, a DC power supply B, voltage sensors 11, 17, system relays SR1, SR2, smoothing capacitors C1, C2, a current sensor 15, a motor M, and the motor controller 10. The motor controller 10 includes a converter 20, an inverter 30, and a control unit 40.

The engine E is an internal combustion engine which outputs running power of a vehicle. The output shaft of the engine E is coupled with driving wheels 56 via a transmission 52 and an axle 54. Thus, the hybrid vehicle 100 can run by transmitting output from the engine E to the driving wheels 56.

The motor M is a drive electric motor for outputting running power of a vehicle. The motor M may be configured to serve also as a power generator driven by the engine E. Further, the motor M may be configured to serve as an electric motor for the engine E so as to be capable of starting the engine. Further, two or more pairs of the motor M and the inverter 30 may be provided and connected in parallel to the common converter 20.

The DC power supply B is a power supply device comprising a secondary battery including nickel hydride or lithium ion, or the like. As the power supply device, an energy storage device such as a capacitor may be used other than the secondary battery, or a fuel cell may be used together with the secondary battery. The DC voltage Vb output from the DC power supply B is sensed by the voltage sensor 11 and the sensed value is sent to the control unit 40.

The system relay SR1 is connected between a positive terminal of the DC power supply B and a power line 12. The system relay SR2 is connected between a negative terminal of the DC power supply B and a ground line 13. The system relays SR1, SR2 are switched ON or OFF by a signal SE from the control unit 40.

The converter 20 includes a reactor L1, power semiconductor switching devices Q1, Q2, and diodes D1, D2. The power semiconductor switching devices Q1, Q2 are connected in series between a power line 14 and the ground line 13.

The power semiconductor switching devices Q1, Q2 are controlled to be ON or OFF in accordance with switching control signals S1, S2 from the control unit 40. Further, the diodes D1, D2 are respectively connected in anti-parallel to the power semiconductor switching devices Q1, Q2.

The reactor L1 is connected between a connection node of the power semiconductor switching devices Q1, Q2 and the power line 12. Further, the smoothing capacitor C2 is connected between the power line 14 and the ground line 13.

The inverter 30 includes a U-phase arm 32, a V-phase arm 34, and a W-phase arm 36 which are connected in parallel between the power line 14 and the ground line 13. Each phase arm includes switching devices which are connected in series between the power line 14 and the ground line 13. For example, the U-phase arm 32 may include switching devices Q3, Q4; the V-phase arm 34 may include switching devices Q5, Q6; and the W-phase arm 36 may include switching devices Q7, Q8. Further, anti-parallel diodes D3 to D8 are respectively connected to the switching devices Q3 to Q8. The switching devices Q3 to Q8 are controlled to be ON or OFF in accordance with switching control signals S3 to S8 from the control unit 40.

A midpoint of each phase arm is connected to an end of each phase coil of the motor M. The motor M is a three-phase permanent magnet synchronous motor. The three phase (U, V, and W) coils are connected at one end to the common neutral point. Further, the other end of each of the phase coils is connected to the midpoint of the switching devices of the respective phase arms 32 to 36.

In boosting operation, the converter 20 can boost or transmit without boosting a DC voltage supplied from the DC power supply B to the inverter 30. The output voltage from the converter 20 is also called hereinafter "inverter input voltage" or "system voltage VH." The converter 20 boosts the DC voltage such that the upper arm switching device Q1 and the lower arm switching device Q2 are alternately turned ON in response to the switching control signals S1, S2 from the control unit 40; and the boosting ratio accords with the ratio of the ON periods of the switching devices Q1, Q2.

In bucking operation, the converter 20 bucks the DC voltage supplied from the inverter 30 via the smoothing capacitor C2 and charges the DC power supply B. More specifically, in response to the switching control signals S1, S2 from the control unit 40, the period in which the switching device Q1 alone is turned ON and the period in which both of the switching devices Q1, Q2 are turned OFF are alternately provided; and the bucking ratio accords with the duty ratio of this ON period of the switching device Q1.

The smoothing capacitor C2 smooths the DC voltage from the converter 20 and supplies the smoothed DC voltage to the inverter 30. The voltage sensor 17 senses a voltage at both ends of the smoothing capacitor C2; that is, the system voltage VH, and outputs the sensed value to the control unit 40.

In powered running of the vehicle, the inverter 30 drives the motor M to output positive torque if a torque command value of the motor M is positive (Tqcom>0) when a DC voltage is supplied from the smoothing capacitor C2 by converting the DC voltage to an AC voltage by using switching operation of the switching devices Q3 to Q8 in accordance with the switching control signals S3 to S8 from the control unit 40. If the torque command value of the motor is zero (Tqcom=0), the inverter 30 drives the motor M to output a zero torque by converting the DC voltage to an AC voltage by using switching operation in response to the switching control signals S3 to S8. In this way, the motor M is driven to output a zero or positive torque as commanded with the torque command value Tqcom.

Further, in regenerative braking of the vehicle, the torque command value Tqcom of the motor M is set at a negative value (Tqcom<0). In this case, the inverter 30 converts an AC voltage generated by the motor M to a DC voltage by using switching operation in response to the switching control signals S3 to S8, and supplies the converted DC voltage (system voltage) to the converter 20 via the smoothing capacitor C2. It should be noted that the regenerative braking includes not only deceleration (or stopping acceleration) of the vehicle during regenerating power by releasing a gas pedal during running without operating the foot brake, but also braking by a driver through operation of the foot brake.

The current sensor 15 senses a motor current flowing through the motor M and outputs the sensed motor current to the control unit 40. It should be noted that because the sum of instantaneous values of the three-phase currents iu, iv, iw is zero, it is only necessary to position the current sensor 15 to sense two phase motor currents (for example, V-phase current iv and W-phase current iw) as shown in FIG. 1.

A rotation angle sensor (resolver) 16 senses a rotor rotation angle θ of the motor M and sends the sensed rotation angle θ to the control unit 40. Based on the rotation angle θ, the control unit 40 can calculate a rotation speed N of the motor M and a vehicle speed V of the hybrid vehicle 100.

The control unit 40 can be formed from a micro-computer including a Central Processing Unit (CPU), a Random Access Memory (RAM), and a Read Only Memory (ROM). The ROM stores in advance control programs of the converter 20 and the inverter 30 described below and data required for control. The CPU serves to read out and execute programs stored in the ROM. The RAM serves to temporarily store a control program read out from the ROM and data required for control.

The control unit 40 controls operations of the converter 20 and the inverter 30 based on the torque command value Tqcom input from an external electronic control unit, a battery voltage Vb sensed by the voltage sensor 11, a system voltage VH sensed by the voltage sensor 17, motor currents iv, iw from the current sensor 15, and a rotation angle θ from the rotation angle sensor 16. In other words, the control unit 40 generates and outputs the switching control signals S1 to S8 to the converter 20 and the inverter 30 to control the converter 20 and the inverter 30 as described above.

When the converter 20 is in a boosting operation, the control unit 40 generates the switching control signals S1, S2 such that the system voltage VH, which is the converter output voltage sensed by the voltage sensor 17, is equal to the system voltage command value VH# by feedback control.

Further, upon receiving a signal RGE, from an external ECU, indicating that the hybrid or electric vehicle has entered into a regenerative braking mode, the control unit 40 generates and outputs the switching control signals S3 to S8 to the inverter 30 in order to convert an AC voltage generated by the motor M to a DC voltage. Then, the inverter 30 converts the AC voltage generated by the motor M to a DC voltage and supplies the DC voltage to the converter 20. When receiving the signal RGE, from the external ECU, indicating that the vehicle has entered the regenerative braking mode, the control unit 40 also generates and outputs the switching control signals S1, S2 to the converter 20 to buck the DC voltage supplied from the inverter 30. Thus, the AC voltage generated by the motor M is converted to the DC voltage, and bucked and supplied to the DC power supply B.

The control unit 40 also generates and outputs the signal SE to the system relays SR1, SR2 to turn the system relays SR1, SR2 ON and OFF.

The control unit 40 is connected with an eco switch 62 and an EV switch 64. The eco switch 62 is an input switch which is turned ON when the driver wishes to place priority on fuel efficiency rather than driving performance of the vehicle. The EV switch 64 is an input switch for selecting a running mode in which the vehicle runs by power from the motor M alone with the engine E being stopped when the driver turns the EV switch 64 ON at a speed lower than a predetermined speed. Each of the switches 62, 64 is disposed near the driver's seat so that the driver or passenger can easily operate the switches. It should be noted that these switches 62, 64 may be formed from various types of switches such as a push button type, a rotary type, a lever type, a touch panel type, and a speech recognition type.

Electric power conversion by the inverter 30 controlled by the control unit 40 is described below with reference to FIG. 2. FIG. 2 is a table showing control modes in which the control unit 40 controls the inverter 30.

In the motor controller 10 according to this embodiment, electric conversion at the inverter 30 is performed by switching between three control modes, which are a sinusoidal PWM control mode, an overmodulation PWM control mode, and a rectangular wave control mode.

The sinusoidal PWM control mode is commonly used in PWM control. The switching device at each phase arm is controlled to be ON or OFF in accordance with a voltage difference between a sinusoidal voltage command value and a carrier wave (typically, a triangular wave). As a result, a duty ratio is controlled such that for the collection of a high level period corresponding to the ON period of the upper arm devices and a low level period corresponding to the ON period of the lower arm devices, the fundamental wave components can become a sinusoidal wave within a predetermined period. In this way, as conventionally known, in a general sinusoidal PWM control mode, a modulation degree K showing a ratio of the amplitude of the fundamental wave components with respect to the system voltage VH; that is, an input voltage of the inverter, can be increased up to 0.61. Further, in a sinusoidal PWM control mode in a 2-phase modulation method or three-order harmonic superimposition, the modulation degree K can be increased up to about 0.7.

In the rectangular wave control mode, one pulse of a rectangular wave in which the ratio between the high level period and the low level period is 1:1 is applied to the AC motor within the above predetermined period. In this way, the modulation degree K can be increased up to 0.78. In the rectangular wave control mode, the modulation degree K becomes constant at 0.78.

In the overmodulation PWM control mode, with the carrier wave being distorted to reduce the amplitude of the carrier wave, PWM control the same as used in the above sinusoidal PWM control mode is performed. Consequently, the amplitude of fundamental wave components can be increased, resulting in an increase of the modulation degree K up to a range of 0.61 to 0.78.

As described above, the modulation degree K can be obtained by dividing the line voltage amplitude of the motor M by the system voltage VH (or system voltage command value VH*). The system voltage VH can be changed by controlling the converter 20. Therefore, the control unit 40 can increase or decrease the modulation degree K by adjusting the switching control signals S1, S2 to change the system voltage VH after boost, to thereby set the motor control mode.

Specifically, as described above, the sinusoidal PWM control mode can be selected for the modulation degree K up to 0.61 (K≤0.61); the overmodulation PWM control mode can be selected for the modulation degree K of more than 0.61 to less than 0.78 (0.61<K<0.78); and the rectangular wave control mode can be selected for the modulation degree K equal to or more than 0.78 (K≥0.78).

FIG. 3 shows how the control unit 40 of FIG. 1 sets a control mode. As shown in FIG. 3, the sinusoidal PWM control mode is used in a low rotation speed range A1; the overmodulation PWM control mode is used in a middle rotation speed range A2; and the rectangular wave control mode is used in a high rotation speed range A3. A "map" showing such a relationship between a rotation speed and a torque corresponding to each system voltage VH is stored in the ROM of the control unit 40. Thus, which one of the control modes in FIG. 2 is used is determined in a possible range of the modulation degree as described above, by referring to the map corresponding to the system voltage VH at the time.

FIG. 4 shows a relationship between a boost voltage boosted by the converter 20 and the control modes in FIG. 3.

A map M1 shown in a solid line in FIG. 4 is referred to in a normal mode in which the boost voltage boosted by the converter 20 is allowed up to the system voltage maximum value VHmax set in consideration of withstand voltage performance and other factors of the switching devices Q1 to Q8. The system voltage maximum value VHmax in the normal mode may be set at, for example, 600 V.

In contrast, a map M2 is referred to in a boost limit mode in which the boost voltage VH by the converter 20 is limited to equal to or less than the boost limit value VHlim, which is lower than the system voltage maximum value VHmax. The boost limit value VHlim may be set to, for example, 400 V.

As shown in FIG. 4, even when the rotation speeds and the torques of operation points of the motor M belong to the same region, the control mode to be applied may differ depending on whether or not the output voltage VH from the converter 20 is limited. For example, for the area Y commonly used in a 10-15 mode fuel efficiency measurement, the sinusoidal PWM control mode is applied in the region A1 in the normal mode, while in the boost limit mode, the rectangular wave control mode is applied, as the operation point belongs to the region B3.

Figure 5:
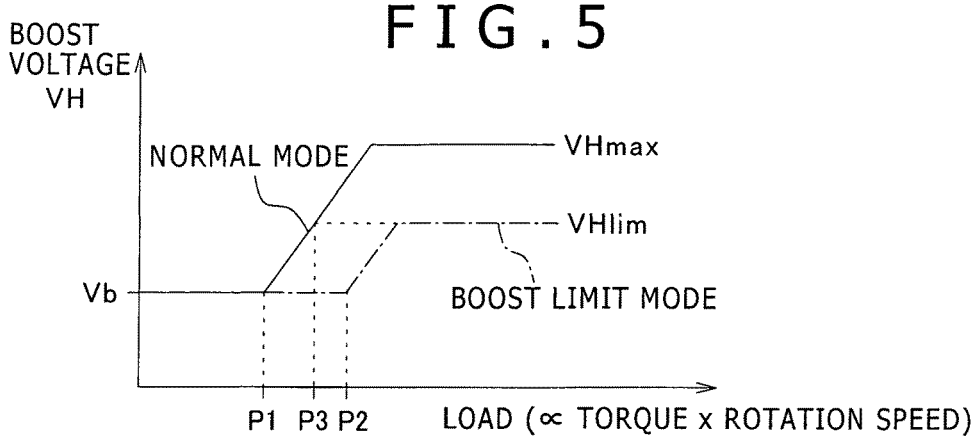
FIG. 5 is a mapping graph used to determine a boost voltage for a load.

FIG. 5 shows maps used to determine a boost voltage for a load. The load shown in the horizontal axis is proportional, for example, to the product of the torque and the rotation speed of the motor M under a certain number of rotations. In the normal mode in which a map M1 is selected, as shown in a solid line in FIG. 5, the boost voltage VH boosted by the converter 20 is allowed up to the system voltage maximum value VHmax.

In contrast, in the boost limit mode (also called eco mode) in which the map M2 is selected, as show in a dash-dot line in FIG. 5, the boost voltage VH is limited to be lower than in the normal mode. Specifically, while the load to start the boost is P1 in the normal mode, the load to start the boost in the boost limit mode is P2 (>P1), resulting in a larger boost start threshold. Further, the boost limit value VHlim is limited to be lower than the system voltage maximum value VHmax. In other words, with the converter 20 in the boost limited state, the boost by the converter 20 is performed not as much as in the normal mode.

When the mode is switched from the boost limit mode to the normal mode in an area with a load larger than P1, the boost voltage VH is set higher than in the previous mode, and in an area with a load larger than P3, the boost voltage VH is set higher than the boost limit value VHlim. It should be noted that, although P3<P2 in FIG. 5, the relationship may be contrary as P3>P2.

Thus, by applying the boost limit to the converter 20, an attempt can be made to improve fuel efficiency of the vehicle by restricting the switching loss at the converter 20 and using the rectangular wave control mode more to restrict the switching loss at the inverter 30.

Figure 6:
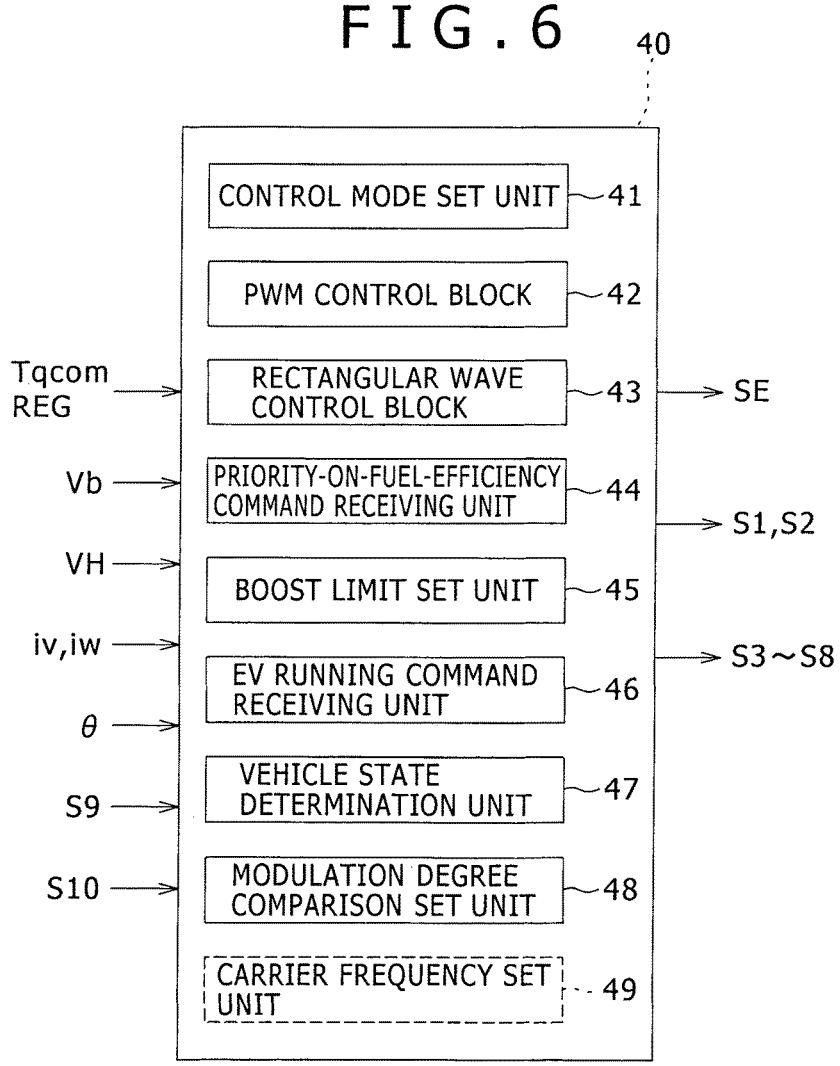
FIG. 6 is a function block diagram showing a configuration of the control unit shown in FIG. 1.

FIG. 6 is a function block diagram of the control unit 40 of the motor controller 10 according to the present embodiment. The control unit 40 includes a control mode set unit 41, a PWM control block 42, a rectangular wave control block 43, a priority-on-fuel-efficiency command receiving unit 44, a boost limit set unit 45, an EV running command receiving unit 46, a vehicle state determination unit 47, and a modulation degree comparison set unit 48. Each of the components 41 to 48 can be realized by software executed by the control unit 40. However, these components are not limited to software. Some of the components may be realized by hardware. It should be noted that a carrier frequency set unit 49 shown in FIG. 6 in a broken line frame is described in detail below.

As described above, the control mode set unit 41 serves to select and set a control mode of the motor M from the sinusoidal PWM control mode, overmodulation PWM control mode, and rectangular wave control mode in accordance with the modulation degree K.

The PWM control block 42 serves to control the operation of the inverter 30 to drive the motor M in the sinusoidal PWM control mode or the overmodulation PWM control mode. Specifically, by feedback controlling the motor current, the PWM control block 42 generates switching control signals S3 to S8 respectively to the switching devices Q3 to Q8 of the inverter 30 such that a torque is output at the motor M in accordance with the torque command Tqcom entered from outside. It should be noted that, in the overmodulation PWM control mode, the carrier wave used to generate the switching control signals S3 to S8 is changed from a general carrier wave used in the sinusoidal PWM control mode.

The rectangular wave control block 43 serves to control the operation of the inverter 30 to drive the motor M in the rectangular wave control mode. Specifically, by feedback controlling the torque expected based on the motor current, the rectangular wave control block 43 generates switching control signals S3 to S8 respectively to the switching devices Q3 to Q8 of the inverter 30 such that a torque is output at the motor M in accordance with the torque command Tqcom entered from outside.

The priority-on-fuel-efficiency command receiving unit 44 serves to detect that the eco switch 62 (refer to FIG. 1) has been turned ON. The boost limit set unit 45 serves to limit the boost voltage VH boosted by the converter 20 based on the detection result of the priority-on-fuel-efficiency command receiving unit 44. Specifically, the priority-on-fuel-efficiency command receiving unit 44 and the boost limit set unit 45 limit the upper limit of the boost voltage VH of the converter 20 to the boost limit value VHlim, which is lower than the boost voltage maximum value VHmax, by executing the processes shown in FIG. 7.

Figure 7:
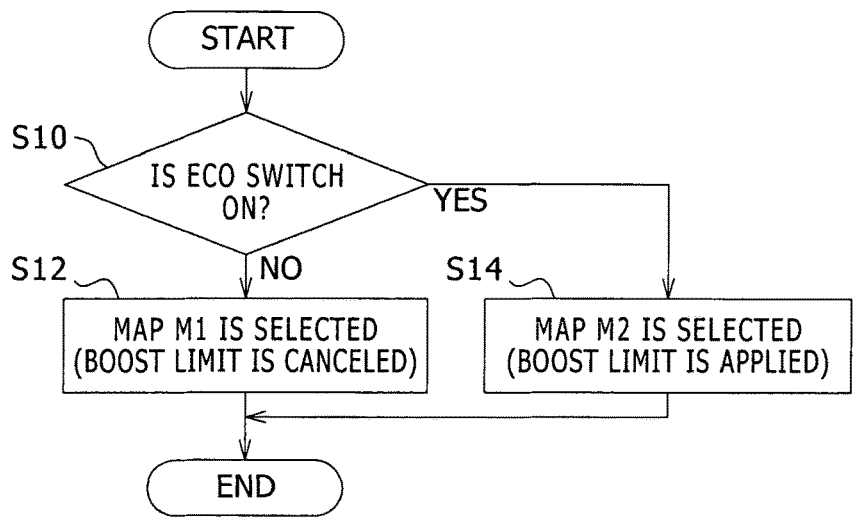
FIG. 7 is a flowchart showing a boost limit process performed by a control unit.

As shown in FIG. 7, it is first determined in step S10 whether or not the eco switch 62 has been turned ON. This is determined as a function of the priority-on-fuel-efficiency command receiving unit 44. This determination is performed in accordance with the presence or absence of a signal S9 which is entered to the control unit 40 when the eco switch 62 is turned ON. If it is determined that the eco switch 62 has not been turned ON (NO in S10), the map M1 (refer to FIG. 4) is selected to determine the control mode of the motor M, and the normal mode (refer to FIG. 5) is set as the boost voltage map of the converter 20. That is, the converter 20 is in the boost limit canceled state.

On the contrary, if it is determined in the above step S10 that the eco switch 62 has been turned ON (YES in S10), the map M2 (refer to FIG. 4) is selected to determine the control mode of the motor M, and the boost limit mode (refer to FIG. 5) is set as the boost voltage map of the converter 20. That is, the converter 20 is in a boost limited state. The driver is notified by, for example, light emission or a display that the EV switch 64 is ON.

The EV running command receiving unit 46 serves to detect that the EV switch 64 (refer to FIG. 1) has been turned ON. This detection is performed in accordance with the signal S10 which is input to the control unit 40 when the EV switch 64 is turned ON. The driver is notified by, for example, light emission or a display that the EV switch 64 is ON. In response to the receipt of the above signal S10, the control unit 40 switches the mode to the motor running mode in which running is performed on the power of the Motor M alone as described above, provided that the operation point of the motor M belongs to the region where the torque and the rotation speed fall below predetermined values.

The vehicle state determination unit 47 serves to determine the state of the hybrid vehicle 100. Specifically, the vehicle state determination unit 47 calculates a vehicle speed V based on the rotation speed N of the motor M and based on the calculated vehicle speed V, the vehicle state determination unit 47 can determine whether or not the vehicle is in a low speed running mode.

The modulation degree comparison set unit 48 serves to calculate the modulation degree K based on the line voltage amplitude of the motor M and the system voltage command value VH# entered to the control unit 40; and compares the calculated modulation degree K and a predetermined threshold Kth. In this way, it is possible to determine whether the control mode of the motor M is the rectangular wave control mode or the overmodulation PWM control mode.

As described above, in the hybrid vehicle 100 mounted with the motor controller 10 according to the present embodiment, when a driver who places a priority on the fuel efficiency turns the eco switch 62 ON, an attempt is made to improve fuel efficiency by applying the boost limit to the converter 20 to restrict a switching loss. Further, when a driver turns the EV switch 64 ON in a case, for example, that the driver cares about noise while driving in a residential area at midnight, the mode is switched to the motor running mode with the operation of the engine E stopped. In this way, as the operation noise of the engine E does not occur from the hybrid vehicle 100, quiet running can be achieved.

In particular when the motor running mode is selected while the converter 30 is in the boost limit mode and the vehicle is running at a relatively slow speed, a high-frequency noise which occurs in the rectangular wave control mode becomes significant because no operation sound exists as the engine E is stopped and a tire noise reaching inside the vehicle is reduced.

When the motor M is driven in the rectangular wave control mode with the vehicle in a quiet state as described above, because more higher-order-harmonic components are superimposed to a current flowing in a motor than in a sinusoidal PWM control mode, current ripples caused by the harmonic components more easily occur, and thereby the high-frequency noise while the vehicle is running may be larger. In such a case, even though the driver selects the motor running mode by turning the EV switch 64 ON in order to obtain a quiet running, the high-frequency noise may occur by driving the motor M in the rectangular wave control mode. In particular, when the motor running mode is selected while running at a relatively slow speed, the high-frequency noise which occurs in the rectangular wave control mode becomes more significant because no operation sound exists as the engine E is stopped and tire noise reaching inside the vehicle is reduced.

Therefore, in the motor controller 10 according to the present embodiment, the following steps to cancel the boost limit are performed in order to restrict noise occurrence due to the rectangular wave control of the motor M when the motor running mode is selected with the converter 20 in the boost limit mode.

Figure 8:
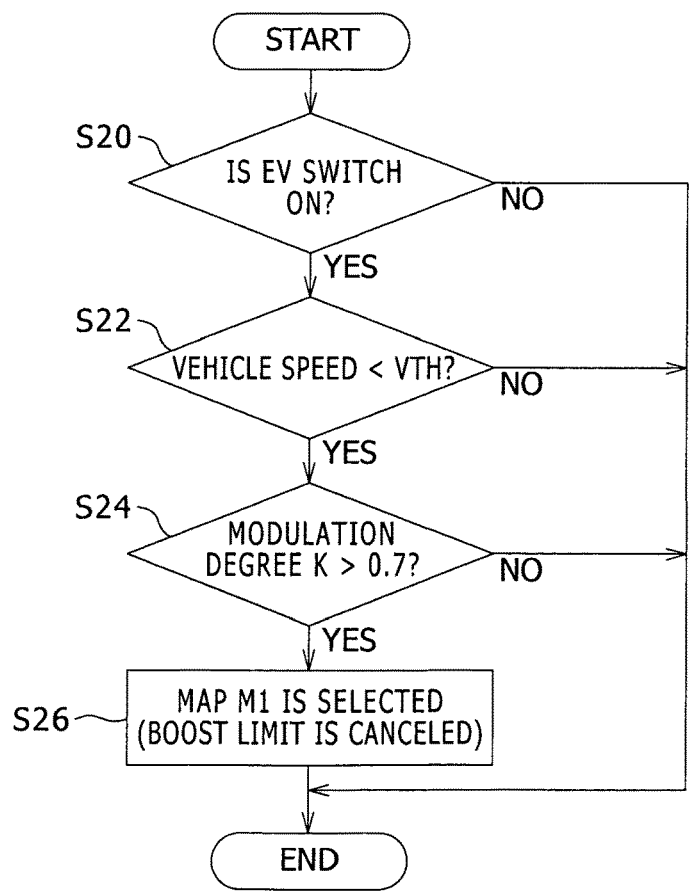
FIG. 8 is a flowchart showing one example of a boost limit canceling process performed by a control unit.

FIG. 8 is a flowchart showing one example of the boost limit canceling process performed by the control unit 40. The process shown in FIG. 8 is performed at predetermined time intervals while the map M2 is selected and the converter 20 is in the boost limit mode.

As shown in FIG. 8, it is first determined in step 20 whether or not the EV switch 64 has been turned ON. This is determined as a function of the EV running command receiving unit 46 described above. If NO is determined, the process is finished without changing the boost limit mode. That is, the boost limit mode of the converter 20 is continued.

On the contrary, if YES is determined in the above step S20, it is further determined in subsequent step S22 whether or not the vehicle speed V is below a predetermined threshold Vth. This determination is performed as a function of the vehicle state determination unit 47 described above. The above threshold Vth may be set at, for example, 30 km/h. If NO is determined, the process is finished without changing the boost limit mode. That is, in this case, the boost limit canceling of the converter 20 is not performed. This is because, even when the motor M is in rectangular wave control and a harmonic noise occurs, the noise is assumed not to be too annoying because the noise will be masked by tire or other noises.

On the contrary, if YES is determined in the above step S22, it is further determined whether or not the modulation degree K is higher than, for example, 0.7 in subsequent step S24. This determination is performed as a function of the modulation degree comparison set unit 48. It should be noted that the threshold to be compared with the modulation degree K is set at 0.7, in order to reliably determine that the motor M is in the rectangular wave control (K≥0.78). However, the above threshold is not limited to 0.7. The threshold may be appropriately set at a value between more than 0.61 to equal to or less than 0.78, although it is preferable to set the threshold with some margin because hunting between applying and canceling of the boost limit may occur if the threshold is set at a value close to 0.78.

If YES is determined in the above step S24 (indicating that the motor M is driven in the overmodulation PWM control mode or the rectangular wave control mode), the map M1 in the normal mode is selected in subsequent step S26 to cancel the boost limit. Thus, the boost voltage VH boosted by the converter 20 is set higher than in the normal mode. In this case, if the boost voltage VH is equal to or less than the boost limit value VHlim when switched to the normal mode (between load P1 and P3 in FIG. 5), the boost voltage VH may be set at least higher than the boost limit value VHlim; for example, at VHmax.

As described above, in the motor controller 10 according to the present embodiment, when the motor running mode is selected with some further boosting applicable by the converter 20, the boost limit of the converter 20 is canceled so as to set the converter output voltage VH higher than the boost limit value VHlim such that the control mode of the motor M is switched from the rectangular wave control mode or the overmodulation PWM control mode to the sinusoidal PWM control mode. In this way, as the ripples in the motor current can be restricted, the high-frequency noise can be restricted.

Next, another example of the boost limit canceling process performed by the control unit 40 is described by reference to FIG. 9. Here, only differences from the boost limit canceling described above by reference to FIG. 8 are mainly described.

In FIG. 9, steps S20 to S26 are identical to the steps in the boost limit canceling in FIG. 8. In the last step, S28, the system voltage VH; that is, the converter output voltage, is set such that the motor M is driven at the lower limit voltage for the sinusoidal PWM control mode. Specifically, the target modulation degree Ktag for the sinusoidal PWM control mode is set (for example, at 0.6) while maintaining the boost voltage VH as low as possible and the switching control signals S1, S2 to the converter 20 are adjusted such that the actual modulation degree K becomes equal to the target modulation degree Ktag. In this way, there can be minimized fuel efficiency deterioration due to the increased switching loss caused by the avoidance of the rectangular wave control mode.

Next, by reference to FIGS. 6 and 10, yet another example of the boost limit canceling process performed by the control unit 40 is described. Here, only differences from the boost limit canceling described above by reference to FIGS. 8 and 9 are described by reference to FIG. 10.

In FIG. 6, the control unit 40 includes the carrier frequency set unit 49. The carrier frequency set unit 49 serves to change the carrier wave frequency F used in the PWM control by the inverter 30 in accordance with the rotation speed of the motor M. Specifically, the carrier frequency set unit 49 can switch the carrier frequency F such that when the rotation speed of the motor is lower, the carrier frequency F becomes lower. For example, switching of the carrier frequency is performed in two or more steps in accordance with a predetermined range of the motor speed N.

Subsequently, in FIG. 10, the process show in steps S20, S22, S24, and S26 in identical to the boost limit canceling shown in FIG. 8; and the steps S20, S22, S24, S26 and S28 are identical to the boost limit canceling shown in FIG. 9.

Therefore, the only different step is step S25. In FIG. 10, step S28 is shown in a broken line, because step S28 may be omitted.

When the modulation degree K is determined to be larger than 0.7 in step S24, it is determined in the subsequent step S25 whether or not the carrier frequency F belongs to a high carrier frequency region. As shown as the area Z in FIG. 4, the high carrier frequency region with the boost limit applied indicates that the operation point of the motor M belongs to the overmodulation PWM control region B2 and the rectangular wave control region B3 in a high rotation speed region.

When the carrier frequency F used by the inverter 30 is set at a relatively low value, the switching cycle becomes long. Accordingly, when the boost limit is canceled in a low carrier frequency region and the system voltage VH is increased, the current change in a switching control cycle becomes larger than in the higher carrier frequency F, resulting in larger current ripples and increased noise.

Therefore, in the boost limit canceling in FIG. 10, the boost limit canceling and the switching to the sinusoidal PWM control are performed when the carrier frequency F belongs to a relatively high region. In other words, if NO is determined in step S25 because the carrier frequency F belongs to a low carrier frequency region, the process is finished without canceling the boost limit.

On the contrary, if YES is determined in step S25, in the subsequent step S26, the map M1 is selected and the boost limit is canceled. In this way, the noise increase after the control mode of the motor M is switched to the sinusoidal PWM control mode can be restricted.

It should be noted that a motor controller according to the present invention is not limited to the configurations in the embodiments and variation examples described above. Various improvements are possible within the matters described in the claims of the present application and in the equivalent scope.

Although it is described above that when a running mode to run a vehicle by a motor power alone is selected with the boost limit applied to the output voltage of the converter, the boost limit of the converter is canceled only when the vehicle speed becomes lower than a predetermined threshold, the present invention is not limited to this embodiment. For example, by collecting noise from the inverter and the motor through a microphone or the like, the boost limit of the converter can be canceled when the high-frequency sound in the collected noise is higher than a predetermined level.

REFERENCES SIGNS LIST 10 motor controller, 11, 17 voltage sensors, 12, 14 power lines, 13 ground line, 15 current sensor, 16 rotation angle sensor, 20 converter, 30 inverter, 32 U-phase arm, 34 V-phase arm, 36 W-phase arm, 40 control unit, 41 control mode set unit, 42 PWM control block, 43 rectangular wave control block, 44 priority-on-fuel-efficiency command receiving unit, 45 boost limit set unit, 46 EV running command receiving unit, 47 vehicle state determination unit, 48 modulation degree comparison set unit, 49 carrier frequency set unit, 52 transmission, 54 axle, 56 driving wheel, 62 eco switch, 64 EV switch, 100 hybrid vehicle, B DC power supply, C1, C2 smoothing capacitors, D1 to D8 diodes, E engine, K modulation degree, Ktag target modulation degree, Kth modulation threshold, L1 reactor, M motor, M1, M2 maps, N rotation speed, Q1 to Q8 switching devices, SR1, SR2 system relays, and θ rotor rotation angle.

The invention claimed is:

1. A motor controller for a hybrid vehicle mounted with an internal combustion engine and a motor as power sources, the motor controller comprising:
   a converter capable of boosting a voltage supplied from a power supply device;
   an inverter which converts an output voltage of the converter to an AC voltage and applies the AC voltage to the motor;
   a control unit which controls the inverter to drive the motor by switching between a plurality of control modes; and
   an EV switch connected to the control unit, the EV switch being configured to select a running mode in which the vehicle runs by power from the motor alone with the engine being stopped when a driver turns the EV switch ON at a speed lower than a predetermined speed,
   wherein when a running mode to drive the vehicle by a motor power alone in response to turning the EV switch ON is selected with a boost limit applied to the output voltage of the converter and when the motor is in a rectangular wave control mode or an overmodulation PWM control mode, the control unit raises the output voltage of the convertor higher than a boost limit value and controls the inverter such that the control mode is switched to drive the motor in a sinusoidal PWM control mode, and in a case where the boost voltage when switched to the sinusoidal PWM control mode is equal to or less than the boost limit voltage, the output voltage of the converter is set at least higher than the boost limit value.

2. The motor controller for the hybrid vehicle according to claim 1, wherein
   the output voltage of the converter is raised higher than the boost limit value when a vehicle speed is less than a predetermined threshold.

3. The motor controller for the hybrid vehicle according to claim 1, wherein
   the control unit sets the output voltage of the converter such that the motor can be driven at a low limit voltage applicable in the sinusoidal PWM control mode.

4. The motor controller for the hybrid vehicle according to claim 2, wherein
   the control unit sets the output voltage of the converter such that the motor can be driven at a low limit voltage applicable in the sinusoidal PWM control mode.

5. The motor controller for the hybrid vehicle according to claim 1, wherein
   the control unit can switch a carrier frequency used in the sinusoidal PWM control mode such that when a rotation speed of the motor is lower, the carrier frequency becomes lower; and
   when the carrier frequency belongs to a predetermined high carrier frequency region, the output voltage of the boost converter is raised higher than the boost limit value and a control is performed in the sinusoidal PWM control mode.

6. The motor controller for the hybrid vehicle according to claim 2, wherein
   the control unit can switch a carrier frequency used in the sinusoidal PWM control mode such that when a rotation speed of the motor is lower, the carrier frequency becomes lower; and
   when the carrier frequency belongs to a predetermined high carrier frequency region, the output voltage of the boost converter is raised higher than the boost limit value and a control is performed in the sinusoidal PWM control mode.

7. The motor controller for the hybrid vehicle according to claim 3, wherein
   the control unit can switch a carrier frequency used in the sinusoidal PWM control mode such that when a rotation speed of the motor is lower, the carrier frequency becomes lower; and
   when the carrier frequency belongs to a predetermined high carrier frequency region, the output voltage of the boost converter is raised higher than the boost limit value and a control is performed in the sinusoidal PWM control mode.

8. The motor controller for the hybrid vehicle according to claim 4, wherein
   the control unit can switch a carrier frequency used in the sinusoidal PWM control mode such that when a rotation speed of the motor is lower, the carrier frequency becomes lower; and
   when the carrier frequency belongs to a predetermined high carrier frequency region, the output voltage of the boost converter is raised higher than the boost limit value and a control is performed in the sinusoidal PWM control mode.

* * * * *